(12) United States Patent
Orellana et al.

(10) Patent No.: US 9,282,194 B2
(45) Date of Patent: Mar. 8, 2016

(54) INTEGRATED PRIVATE BRANCH EXCHANGE AND DEVICE CONTROL SYSTEM

(75) Inventors: Alejandro Orellana, Mashpee, MA (US); Michael C. Silva, East Sandwich, MA (US); Yue Zhou, Bourne, MA (US); Timothy R. Locascio, Osterville, MA (US)

(73) Assignee: SAVANT SYSTEMS, LLC, Hyannis, MA (US)

( * ) Notice: Subject to any disclaimer, the term of this patent is extended or adjusted under 35 U.S.C. 154(b) by 0 days.

(21) Appl. No.: 13/603,026

(22) Filed: Sep. 4, 2012

(65) Prior Publication Data

US 2013/0058467 A1 Mar. 7, 2013

Related U.S. Application Data

(60) Provisional application No. 61/531,387, filed on Sep. 6, 2011.

(51) Int. Cl.
| | | |
|---|---|---|
| *H04M 11/00* | (2006.01) | |
| *H04M 7/00* | (2006.01) | |
| *H04L 12/28* | (2006.01) | |
| *H04L 29/06* | (2006.01) | |

(52) U.S. Cl.
CPC ........... *H04M 7/009* (2013.01); *H04L 12/2809* (2013.01); *H04L 12/2836* (2013.01); *H04L 65/1053* (2013.01); *H04L 2012/285* (2013.01); *H04L 2012/2841* (2013.01)

(58) Field of Classification Search
USPC ........... 379/93.01, 39; 340/531; 709/223, 217
See application file for complete search history.

(56) References Cited

U.S. PATENT DOCUMENTS

| | | | | |
|---|---|---|---|---|
| 5,579,221 | A * | 11/1996 | Mun | 700/83 |
| 5,922,047 | A * | 7/1999 | Newlin et al. | 709/217 |
| 5,987,106 | A | 11/1999 | Kitamura | |
| 6,400,265 | B1 * | 6/2002 | Saylor et al. | 340/531 |
| 6,529,230 | B1 * | 3/2003 | Chong | 348/14.01 |
| 6,928,148 | B2 * | 8/2005 | Simon et al. | 379/39 |
| 7,212,516 | B1 * | 5/2007 | O'Sullivan et al. | 370/352 |
| 7,526,539 | B1 * | 4/2009 | Hsu | 709/223 |
| 7,987,490 | B2 | 7/2011 | Ansari et al. | |
| 8,176,112 | B2 | 5/2012 | Hicks, IIII et al. | |
| 8,687,037 | B2 | 4/2014 | Silva et al. | |
| 2001/0041980 | A1 * | 11/2001 | Howard et al. | 704/270 |
| 2001/0046215 | A1 * | 11/2001 | Kim | 370/329 |

(Continued)

OTHER PUBLICATIONS

"Notification of Transmittal of the International Search Report and the Written Opinion of the International Searching Authority, or the Declaration," International Filing Date: Sep. 4, 2012, International Application No. PCT/US2012/053659, Applicant: Savant Systems, LLC, Date of Mailing: Dec. 6, 2012, pp. 1-12.

*Primary Examiner* — Joseph J Nguyen
(74) *Attorney, Agent, or Firm* — Cesari and McKenna, LLP; James A. Blanchette

(57) ABSTRACT

In one embodiment, a state center operates as a repository and exchange point for telephony state information that would not typically be accessible from an Internet Protocol private branch exchange (IP PBX), and control state information that would not typically be accessible from a programmable multimedia controller. In such manner, the state center enables telephony responsive audio/video (A/V) and home automation device control, and A/V and home automation device responsive telephony control.

17 Claims, 15 Drawing Sheets

(56) References Cited

U.S. PATENT DOCUMENTS

2001/0050976 A1* 12/2001 Simon et al. .................... 379/39
2002/0080753 A1* 6/2002 Lee .............................. 370/338
2002/0140855 A1* 10/2002 Hayes et al. .................. 348/465
2007/0124424 A1 5/2007 Matsuda
2007/0142022 A1 6/2007 Madonna et al.

* cited by examiner

System Overview
System IP: 192.168.28.20
Gateway IP: 192.168.28.207 Name: Telephony Gateway Status: OK (26 ms)

← 810

Phones

| Number ▲ | Device ◇ | Display Name | Reg Status | State |
|---|---|---|---|---|
| 2000 | SIP/2000 | Office | OK (9 ms) | N/A |
| 2001 | SIP/2001 | Living Room | OK (8 ms) | N/A |
| 2002 | SIP/2002 | Master Bedroom | OK (8 ms) | N/A |
| 2003 | SIP/2003 | Mobile 1 | OK (15 ms) | N/A |
| 2004 | SIP/2004 | Mobile 2 | OK (15 ms) | N/A |
| 2005 | SIP/2005 | Mobile 2 | OK (15 ms) | N/A |
| 2011 | SIP/2011 | Mike Phone | OK (217 ms) | N/A |
| 2012 | SIP/2012 | Mike iPad | OK (212 ms) | N/A |
| 2013 | SIP/2013 | Jill iPad | OK (1145 ms) | N/A |
| 2021 | SIP/2021 | Guest 1 | Unregistered | N/A |

[First] [Previous] [1] [2] [Next] [Last]

Shared Lines

| Trunk ◇ Name | Number of Stations Assigned |
|---|---|
| Line1 | 13 |

[First] [Previous] [1] [Next] [Last]

System Information

| Component | Description | Version/Info |
|---|---|---|
| Hostname | This server's name | savant-ipbx |
| Platform | Operating System | Linux2.6.32·28·generic1686 |
| Uptime | How long the system has been running | 2 day(s), 17 hour(s), 49 min(s) 52 sec(s) |
| Disk Usage | How much disk space is used | 266.78 GiB free out of 285.64 GiB |
| PHP | Web Interface scripting language | 5.2.10 |
| Apache | Web Service | Apache/2.2.14 |
| PostgreSQL | Database Service | PostgreSQL 8.4.8 on 486·pc· linux·gnu |
| Asterisk | Call Processing Service | Asterisk asterisk·1.8.2.3·build· ast21495_20110809 |

Calling Groups

| Number ▲ | Name | Ring All | # of Members |
|---|---|---|---|
| 7000 | RingAll | Ring All | 0 |
| 8000 | PageAll | Paging | 4 |

[First] [Previous] [1] [Next] [Last]

FIG. 8A

Devices
These are all the devices that the system knows about.

⟵ 820

| | Type ▲ | Name ▲ | Status ⇕ (SIP Only) | Friendly Name ⇕ | Assigned To ⇕ | Server ⇕ | Is Trunk? ⇕ |
|---|---|---|---|---|---|---|---|
| ○ | SIP | 2000 | OK (9 ms) | Office | | savant-ipbx | NO |
| ○ | SIP | 2001 | OK (8 ms) | Living Room | | savant-ipbx | NO |
| ○ | SIP | 2002 | OK (8 ms) | Master Bedroom | | savant-ipbx | NO |
| ○ | SIP | 2003 | OK (14 ms) | Mobile 1 | | savant-ipbx | NO |
| ○ | SIP | 2004 | OK (15 ms) | Mobile 2 | | savant-ipbx | NO |
| ○ | SIP | 2005 | OK (15 ms) | Mobile 3 | | savant-ipbx | NO |
| ○ | SIP | 2011 | OK (217 ms) | Mike iPhone | | savant-ipbx | NO |
| ○ | SIP | 2012 | OK (212 ms) | Mike iPad | | savant-ipbx | NO |
| ○ | SIP | 2013 | OK (1146 ms) | Jill iPad | | savant-ipbx | NO |
| ○ | SIP | 2021 | Unregistered | Guest 1 | | savant-ipbx | NO |

Buttons above table: [Add Device] [Edit Device] [Delete Device]

Show [10 ⇕] entries   Filter: [All ⇕]   Search: [All]

Showing 1 to 10 of 15 entries   [First] [Previous] [1] [2] [Next] [Last]

FIG. 8B

Shared Lines

| Name | Mapped Device | Stations | DND |
|---|---|---|---|
| ○ Line 1 | SIP/Telephony Gateway | 13 | ☐ |

[Add Shared Line] [Edit Shared Line] [Delete Shared Line]

Show [10 ⇵] entries    Search: [ ]

Showing 1 to 1 of 1 entries

[First] [Previous] [1] [Next] [Last]

View / Edit Shared Line Stations
Here you modify the basic settings for this shared line.

Shared line Members

| Shared line Members | Available stations |
|---|---|
| 2000 (SIP/2000)<br>2001 (SIP/2000)<br>2002 (SIP/2002)<br>2003 (SIP/2003)<br>2004 (SIP/2004)<br>2005 (SIP/2005)<br>2011 (SIP/2011)<br>2012 (SIP/2012)<br>2013 (SIP/2013)<br>2021 (SIP/2021)<br>2022 (SIP/2022)<br>2023 (SIP/2023)<br>2024 (SIP/2024) | 2050 (SIP/2050) |

— 840

INTEGRATED PRIVATE BRANCH EXCHANGE AND DEVICE CONTROL SYSTEM

RELATED APPLICATION

The present application claims the benefit of U.S. Provisional Patent Application No. 61/531,387, titled "Integrated Private Branch Exchange and Device Control System", filed on Sep. 6, 2011 by Orellana et al., the contents of which are incorporated by reference herein in their entirety.

BACKGROUND

1. Technical Field

The present disclosure relates generally to telephony and more specifically to interoperation between a private branch exchange (PBX) and audio/video and home automation devices.

2. Background Information

As homes and other structures become larger, and filled with more telephony, audio/video (A/V) and home automation devices, the burden of controlling these devices has also increased. A variety of public branch exchange (PBX) systems have been developed that support voice over IP (VoIP) calling among endpoints located within a home or other structure and remote endpoints. Similarly, a variety of A/V and home automation control systems have been developed for managing A/V and home automation devices. However, such PBX systems and A/V and home automation control systems typically do not communicate with each other, or communicate in only the most basic manners. Detailed telephony state information is not typically accessible to the A/V and home automation control system. Similarly, detailed control state information is not typically accessible to the PBX system. Accordingly, such systems are generally incapable of providing advance functionality, such as telephony responsive A/V and home automation device control, and A/V and home automation device responsive telephony control.

SUMMARY

According to one embodiment of the present disclosure, a special state center may operate as a repository, and exchange point, for telephony state information that would not typically be accessible from an IP PBX, and control state information that would not typically be accessible from a programmable multimedia controller. In such manner, the state center enables telephony responsive A/V and home automation device control, and A/V and home automation device responsive telephony control.

More specifically, in addition to sending messages necessary to execute actual telephony events to an IP PBX, registration messages may also be sent to the state center upon the occurrence of telephony events. The state center may receive the registration messages and update telephony state maintained by the state center. Control modules, through telephony modules that interface with the state center, may register to receive notification messages from the state center for certain types of telephony events. When telephony state changes for a type that is being monitored, a notification message may be sent from the state center to those devices that have registered for notifications. The notification message may inform the devices of the telephony event, and cause the devices to perform responsive actions. The responsive actions may be to control A/V and/or home automation devices. Similarly, registration messages may be provided from a control module to the state center upon the occurrence of control events. The state center may receive the registration messages and update control state maintained by the state center. Other control modules, or the IP PBX, may register to receive notification messages from the state center for certain types of control events. When control state changes for a type that is being monitored, a notification message may be sent from the state center to those devices that have registered for notifications. The notification message may inform the devices of the control event, and cause the devices to perform responsive actions. The responsive actions may be to control calls in a particular manner.

According to another embodiment of the present disclosure, a plurality of selectable share groups may be provided to enable dynamic conferencing among groups of users. An IP PBX may be configured to provide a plurality of dynamic shared line appearances (SLAs), to which endpoints may be dynamically assigned and removed. Endpoints may join a dynamic SLA at any time in response to user-selection of an interface element for a corresponding share group. Similarly, they may leave a dynamic SLA at any time in response to user de-selection of an interface element for the corresponding share group. Similarly, they may transition to a different dynamic SLA by user-selection of an interface element for another share group. In such manner, conference call like functionality may be provided.

BRIEF DESCRIPTION OF THE DRAWINGS

The description below refers to the accompanying drawings of example embodiments, of which:

FIGS. 8A-8D are screen shots of an example web user interface that can be used in conjunction with a Configurator backend to configure the IP PBX.

DETAILED DESCRIPTION

Figure 1:
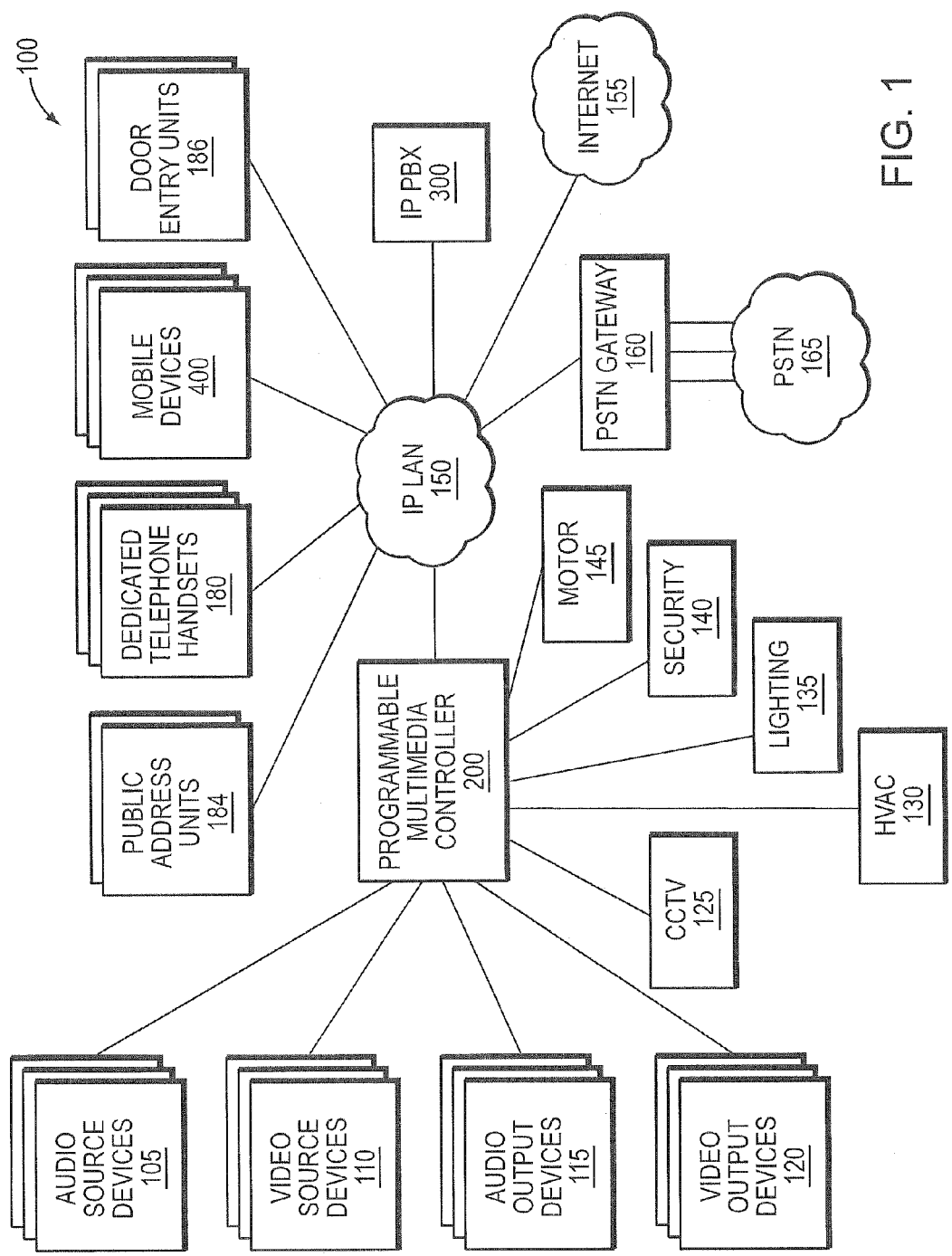
FIG. 1 is a block diagram of an integrated control and private branch exchange (PBX) system that includes a programmable multimedia controller configured to interoperate with an Internet Protocol (IP) PBX server and other devices through an IP network.

FIG. 1 is a block diagram of an integrated control and PBX system 100 that include a programmable multimedia controller 200 configured to interoperate with an IP PBX server 300 and other devices through an IP network 150. As used herein, a "programmable multimedia controller" is a device capable of controlling or switching data between a plurality of audio/video (AV) and/or home automation devices. The programmable multimedia controller 200 may be coupled via wired or wireless links to a variety of A/V devices, including audio source devices 105, such as compact disk (CD) players, digital video disc (DVD) players, microphones, digital video recorders (DVRs), cable boxes, audio/video receivers, and other devices that source audio signals; video source devices 110, such as digital video disc (DVD) players, digital video recorders (DVRs), cable boxes, audio/video receivers and other devices that source video signals; audio output devices 115, such as speakers, devices that incorporate speakers, and other devices that output audio; and video output devices 120, such as televisions, monitors, and other devices that output video. Through such interconnections, the programmable multimedia controller 200 may send control commands to control the operation of such devices. Further, through such interconnections, the programmable multimedia controller may receive audio and/or video content from particular ones of the devices, and switch such content to selected other ones of the devices. In some cases, the programmable multimedia controller 200 may manipulate and/or add to the content, for example, overlay an on-screen display (OSD) on video content.

Further, the programmable multimedia controller 200 may be interconnected via wired or wireless links to a variety of home automation devices, including a closed-circuit television (CCTV) control system 125, a heating ventilation and air conditioning (HVAC) system 130, a electronic lighting controller 135, a security system 140, and a motor operated device controller 145. Through such interconnections, the programmable multimedia controller 200 may send control commands to control the operation of such devices, and the devices coupled thereto. Further, through such interconnections, the programmable multimedia controller 200 may receive status and environmental information.

IP PBX server 300 is coupled to the programmable multimedia controller 200 via a local area network, for example an IP LAN 150. The IP LAN 150 may include a wired IP LAN, for example, an Ethernet LAN, and/or a wireless LAN, for example a WI-FI LAN. The IP PBX server 300 is configured to support calls among endpoints coupled to the LAN using voice over IP (VoIP) connections. Further, the IP PBX server 300 is configured to support call to remote endpoints by directing such calls through a public switched telephone network (PSTN) gateway 160 coupled by one or more traditional telephone lines to the PSTN 165, or by a data connection to the Internet 155.

Endpoints that interoperate with the IP PBX server 300 may take a number of different forms. Depending on the implementation, each endpoint may be a special-purpose unit or a general-purpose device (e.g., a device configured with software to support telephony but capable of a variety of other functions). Some endpoints may include a user interface that allows a user to control, or otherwise interoperate with, the programmable multimedia controller 200. For example, a control interface may be displayed on an endpoint via which a user can control how the programmable multimedia controller 200 manages the A/V and home automation devices located in the home or other structure. Other endpoints may only provide a telephony user interface that allows them to operate as telephone handsets, such that the user can place or receive calls, but is unable to control the programmable multimedia controller 200 from the endpoint.

The endpoints may mobile devices 400, dedicated telephone handsets 180, public address units 184, door entry units 186, as well as a variety of other types of devices. As used herein, the term "mobile device" refers to a general-purpose electronic device that is configured to be transported on one's person, including multimedia smartphones, such as the iPhone® multimedia phone available from Apple Inc., multi-purposes tablet computing devices, such as the iPad® tablet available from Apple Inc., portable media players, such as the iPod® touch available from Apple Inc., personal digital assistants (PDAs), and the like. Typically, mobile devices 400 connect to the IP LAN 150 via a WI-FI connection. However, in some implementations, mobile devices 400 may utilize a mobile Internet broadband connection, for example, a 3G connection, and access the IP PBX Server 300 or the programmable multimedia controller 200 via the Internet.

A mobile device 400 may run a home control and telephony application ("app"). The home control and telephony app may provide a control user interface that includes interface elements for controlling the operations of the programmable multimedia controller 200. In addition, the home control and telephony app may include a telephony user interface that, among other things, replicates the functionality of a physical handset and can be used to place or receive calls through the IP PBX server 300. Further details regarding an example telephony user interface are discussed below in reference to FIGS. 7A-E.

It should be understood that the dedicated telephone handsets 180, public address units 184, and door entry units 186 may provide at least some functionality equivalent to the telephony user interface discussed below in reference to FIGS. 7A-7E. When adapted for use on dedicate telephony handsets 180, public address units 184, or door entry units, the user interface elements of the telephony user interface may be implemented in a variety of different manners, including touch screens, physical buttons, and/or voice-activated controls. Dedicated telephone handsets 180 may take the form of traditional desktop or portable VoIP phones. Public address units 184 may include speaker and microphone systems for intercom of conferencing applications. Further door entry units 186 may include video camera and intercom systems to permit monitoring entry points to a structure.

Figure 2:
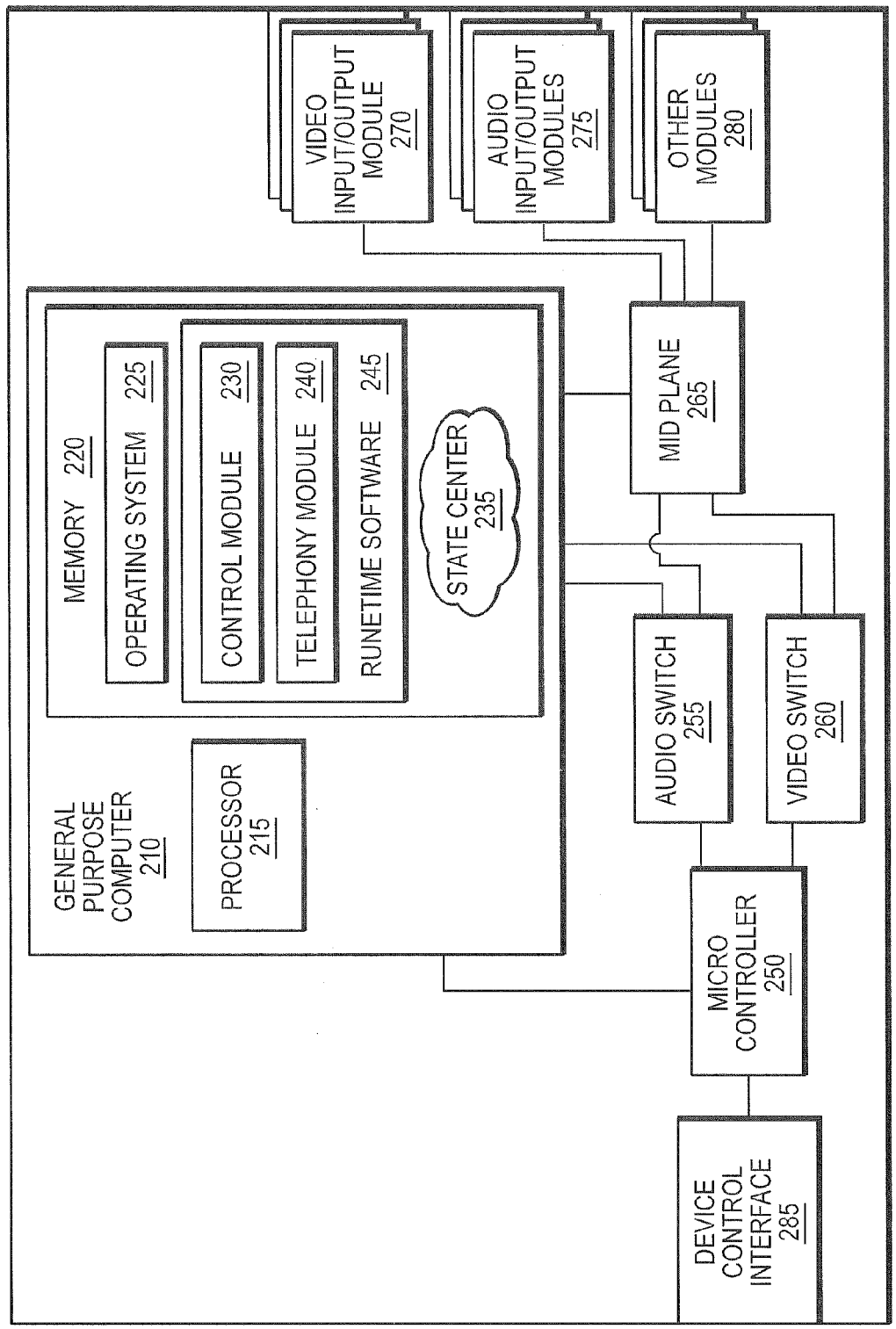
FIG. 2 is an expanded block diagram of the programmable multimedia controller.

FIG. 2 is an expanded block diagram of the programmable multimedia controller 200. At the heart of the programmable multimedia controller 200 is a general-purpose computer 210 having a processor 215 and a memory 220. The memory 220 comprises a plurality of storage locations for storing software and data structures. The processor 215 includes logic configured to execute the software and manipulate data from the data structures. A general-purpose operating system 225, portions of which are resident in memory 220 and executed by the processor 215, functionally organizes the general-purpose computer 210. Runtime software 245 interacts with the operating system 225. The runtime software 245 may include a control module 230 that manages the control and switching of data between A/V and home automation devices by the programmable multimedia controller 200 and a telephony module 240 that manages telephony functions on the programmable multimedia controller. The control module 240 may communicate with control modules executing on endpoints, such as mobile devices 400, as well as with a state center 235 that maintains control state information and telephony state information for the programmable multimedia controller 200 as well as endpoints. The telephony module 240 may communicate with telephony modules executing on mobile devices 400, as well as the state center 235. Further, the telephony module 400 may act as an interface between the control module 230 and IP PBX software operating on the IP PBX server 300.

Interconnected to the general purpose computer 210 is a microcontroller 250 that implements low-level management of switching and device control operations for the programmable multimedia controller 200. In some implementations, an audio switch 255 and/or a video switch 260 may also be included in the programmable multimedia controller 200. The audio switch 255 and the video switch 260 are preferably crosspoint switches capable of switching a number of connections simultaneously. However, many other types of switches capable of switching media signals may be employed. A mid plane 265 may interconnect the audio switch 255 and the video switch 260 to a variety of input and output modules, for example, to one or more video input/output modules 270, one or more audio input/output modules 275, and/or one or more other modules 280. Such modules may include a plurality of connection ports that may be coupled to A/V devices. Further, a device control interface 285 may be provided to communicate with, provide control commands to, and receive status information from, a variety of home automation devices, including the CCTV control system 125, the HVAC system 130, the electronic lighting controller 135, the security system 140, and the motor operated device controller 145 discussed above.

Figure 3:
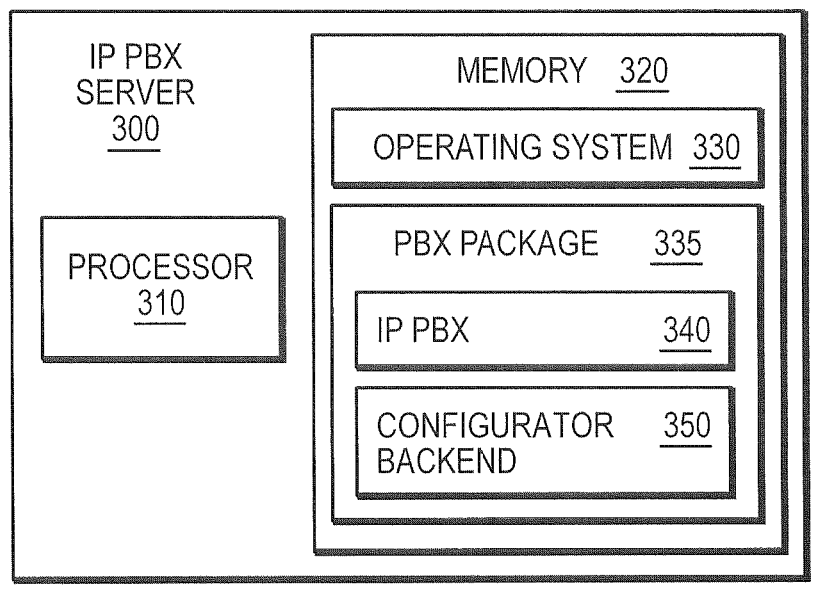
FIG. 3 is an expanded block diagram of the IP PBX server.

FIG. 3 is an expanded block diagram of the IP PBX server 300. The IP PBX server 300 includes a processor 310 and a memory 320. The memory 320 comprises a plurality of storage locations for storing software and data structures. The processor 310 includes logic configured to execute the software and manipulate data from the data structures. An operating system 330, portions of which are resident in memory 320 and executed by the processor 310, functionally organizes the IP PBX server 300. A number of other software modules of a PBX software package 335 may interact with the operating system 330 to implement the techniques discussed herein. The software modules may include IP PBX software (hereinafter simply "IP PBX") 340 that implements VoIP branch exchange functionality. The IP PBX 340 may communicate with the telephony module 240 executing on the programmable multimedia controller 200 and telephony modules executing on endpoints, such as mobile devices 400. A Configurator backend 350 may also be present and act as an interface between the IP PBX 340 and a user interface, for example, a web-based user interface. Further details regarding an example web-based user interface may be found below in reference to FIGS. 8A-8D.

Figure 4:
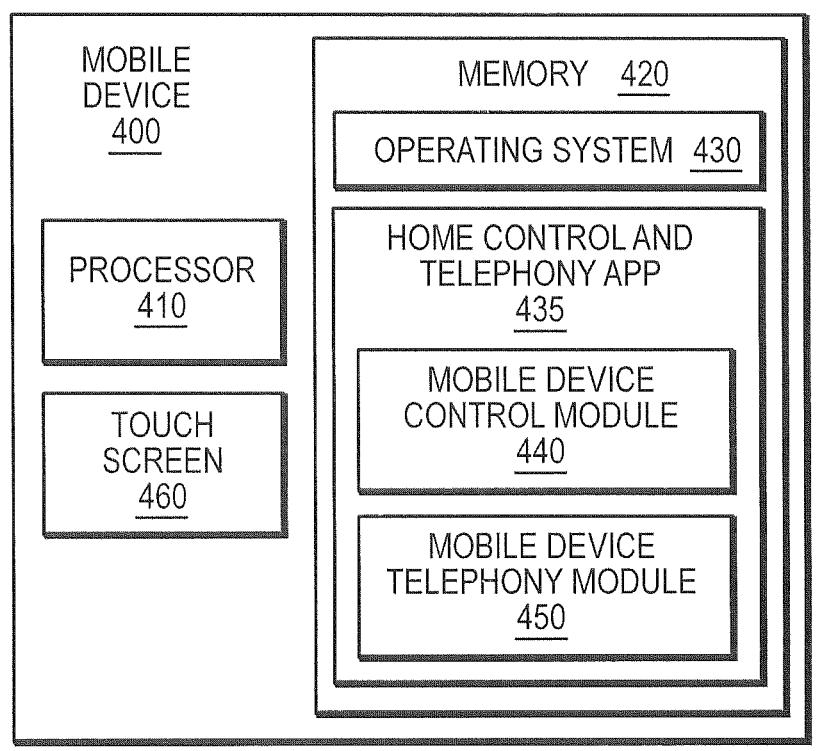
FIG. 4 is an expanded block diagram of an example mobile device.

FIG. 4 is an expanded block diagram of an example mobile device 400. The mobile device may be representative of a variety of other types of endpoints, and include at least some hardware components and software modules common thereto. The mobile device 400 includes a processor 410 and a memory 420. The memory 420 comprises a plurality of storage locations for storing software and data structures. The processor 410 includes logic configured to execute the software and manipulate data from the data structures. An operating system 430, portions of which are resident in memory 430 and executed by the processor 420, functionally organizes the mobile device 400. A home control and telephony app 435 may be executed in conjunction with the operating system 430. The home control and telephony app 435 may include a mobile device control module 440 that provides a control user interface on a touch screen display 460 of the mobile device 400. In response to user selections on the control user interface, the mobile device control module 440 may communicate with the control module 230 operating on the programmable multimedia controller 200 to direct operation of the programmable multimedia controller 200. The mobile device control module 440 may also communicate with the state center 235 so that control state changes are updated there. The control and telephony app 435 may also include a mobile device telephony module 450. The mobile device telephony module 450 may interoperate with the mobile device control module 440 to provide a telephony user interface displayed on the touch screen 460 of the mobile device. The mobile device telephony module 450 may communicate with the telephony module 240 operating on the programmable multimedia controller 200, as well as the IP PBX 340 operating on the IP PBX server 300 to enable telephone functionality. The mobile device telephony module 450 may also communicate with the state center 235 to update telephony state maintained there.

Figure 5:
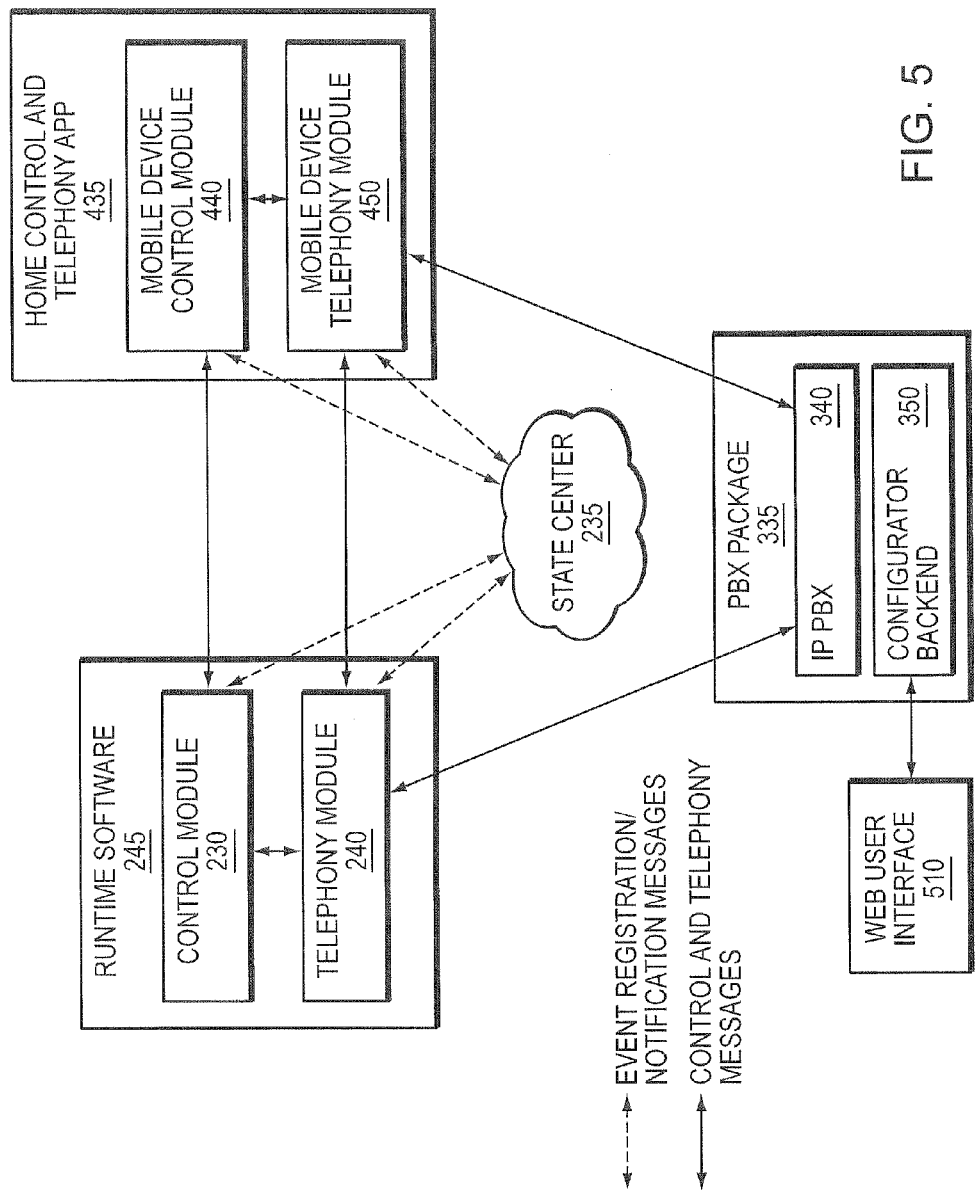
FIG. 5 is a block diagram showing an example message exchange between software modules.

FIG. 5 is a block diagram showing an example message exchange between software modules. Control and/or telephony messages may be exchanged between the control module 230 and the mobile device control module 440 and the telephony module 240 and the mobile device telephony module 450. Further, control and/or telephony messages may be exchanged between the telephony module 235 and the mobile device telephony module 450 and the IP PBX 340. A web-based user interface 510, through a Configurator backend 350, may be used to configure the IP PBX 340.

In addition to these control and telephony message exchanges, registration messages may be specially provided to the state center 235 upon the occurrence of telephony events, and notification messages may be provided from the state center 235 when telephony state information maintained in the state center 235 is updated or otherwise changed. For example, the mobile device telephony module 450 of the home control and telephony app 435, in addition to sending control and/or telephony messages necessary to execute telephony events to the IP PBX 340, may send parallel registration messages to the state center 235. Telephony state may be updated at the state center 235 based upon the received registration messages. The state center 235 may then send notification messages, for example, if a registration message indicates a change of state of a type that is being monitored, to the telephony module 240 of the runtime software 245. The notification messages may cause a responsive action to be performed. In such manner, the runtime software 245 may learn of the occurrence of telephony events that may not be directly detectable from the IP PBX 340 (for example, due to the application program interface (API) of the IP PBX).

Similarly, registration messages may be provided to the state center 235 upon the occurrence of control events, and notification messages may be provided from the state center 235 when control state information maintained in the state center 235 is updated or otherwise changed. For example, the control module 230 of the runtime software 245 may send registration messages to the state center 235 in response to a change of state of one of the A/V or home automation devices coupled to the programmable multimedia controller 200. The state center 235 may then send notification messages, for example, if a registration message indicates a change of state of a type that is being monitored, to the mobile device control module 440 of the home control and telephony app 435. This may cause a responsive action to be performed. In some implementations, notification messages may also be provided to the IP PBX 340. This may cause a responsive action to be performed on a call by the IP PBX. In such manner, the state center 235 may operate as a repository, and exchange point, for telephony state information that would not typically be accessible through IP PBX 340 and control state information that would not typically be accessible by direct communication among control modules and/or the IP PBX 340.

Figure 6:
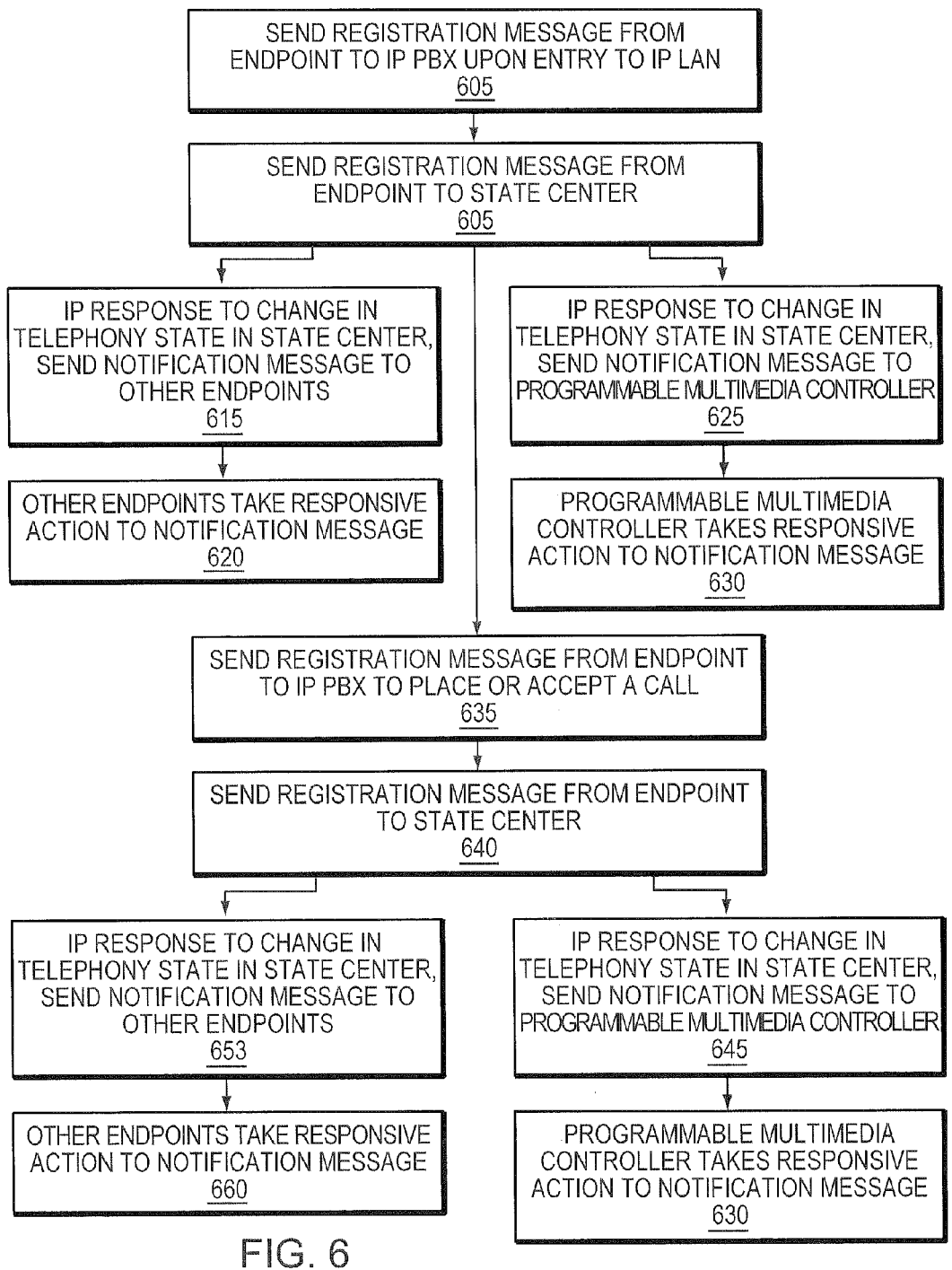
FIG. 6 is a flow diagram of an example sequence of steps that may be executed when an endpoint (e.g., a mobile device) enters the IP LAN.
Figure 7A:
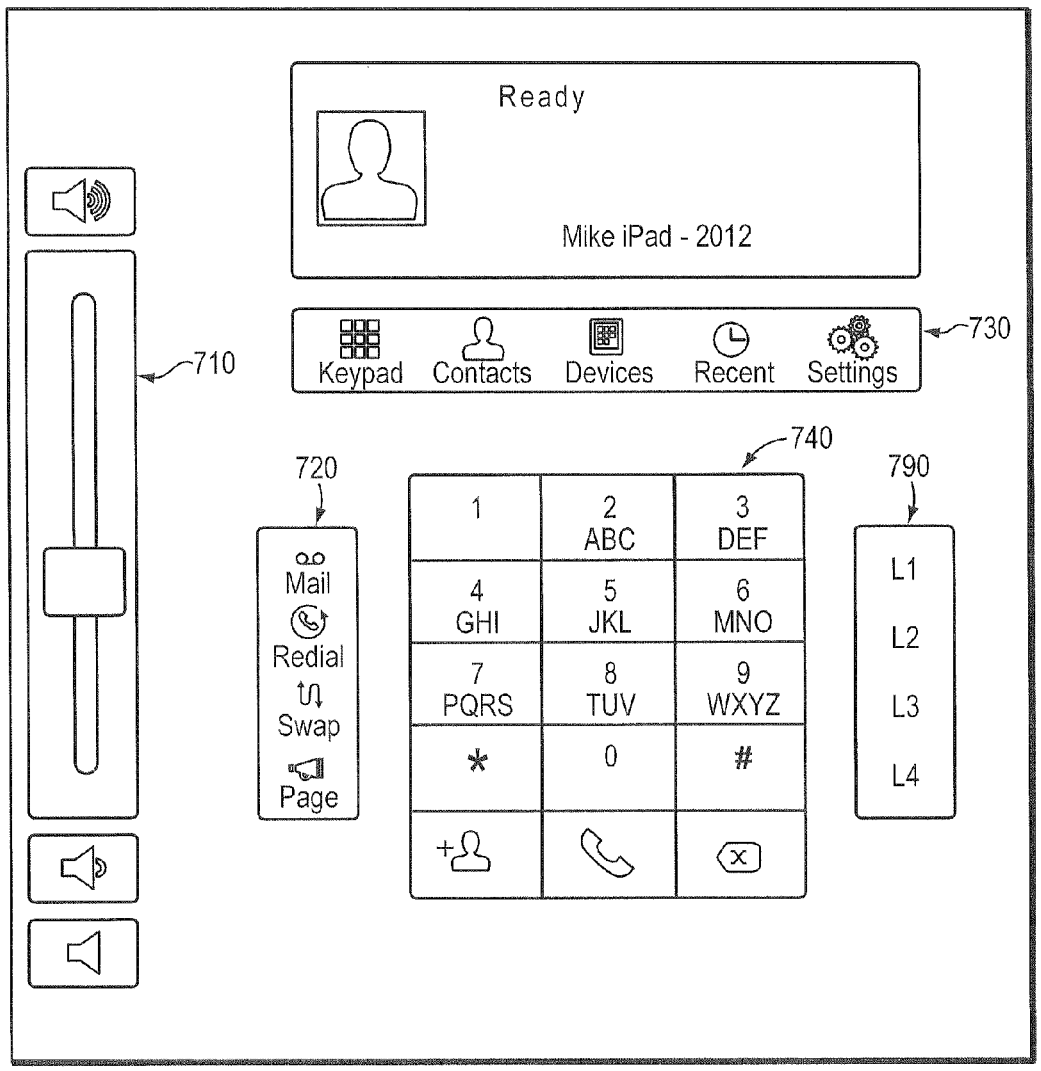
FIGS. 7A-7E are screen shots of an example telephony user interface that can be displayed on endpoints, for example, on a touch screen of a mobile device.
Figure 7B:
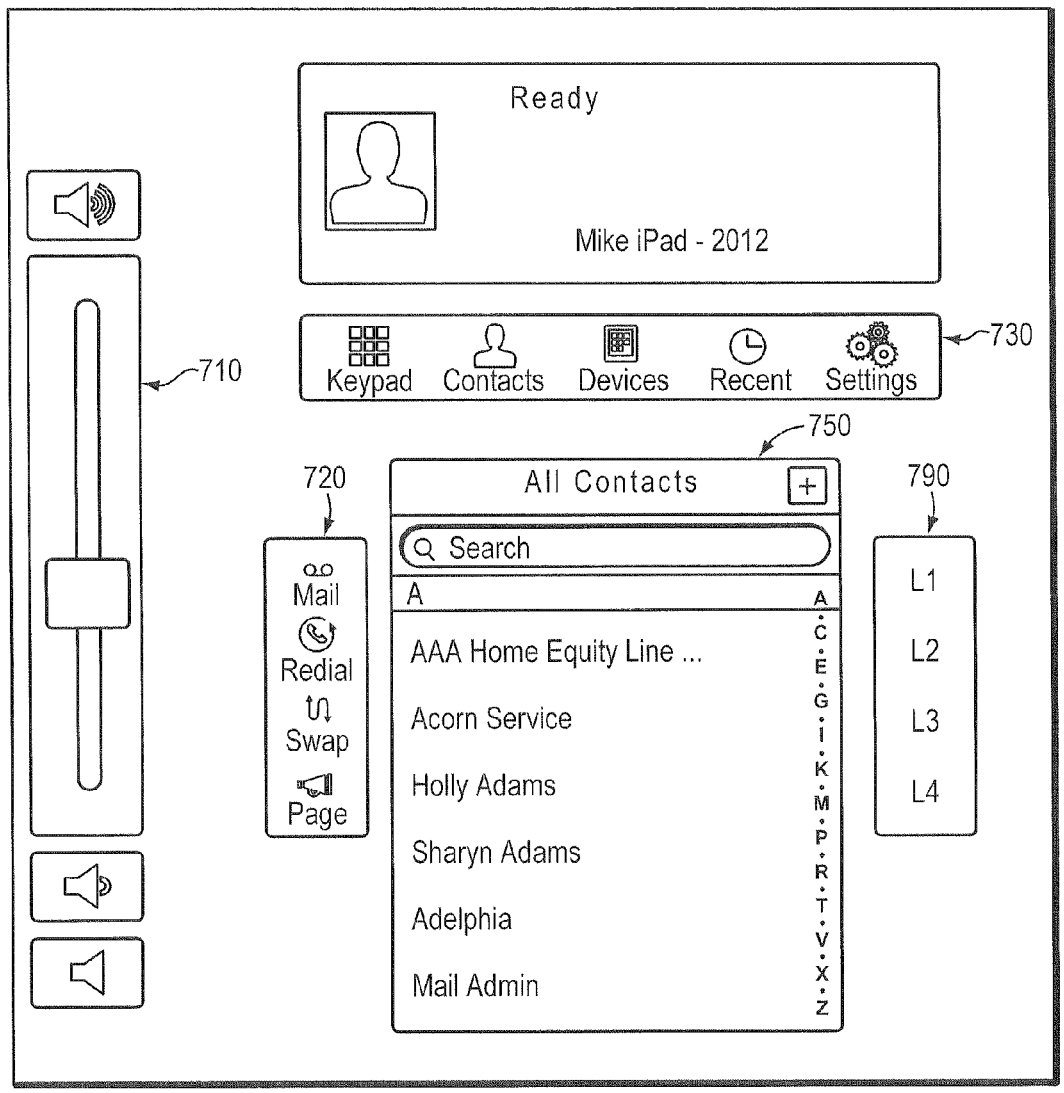
Figure 7C:
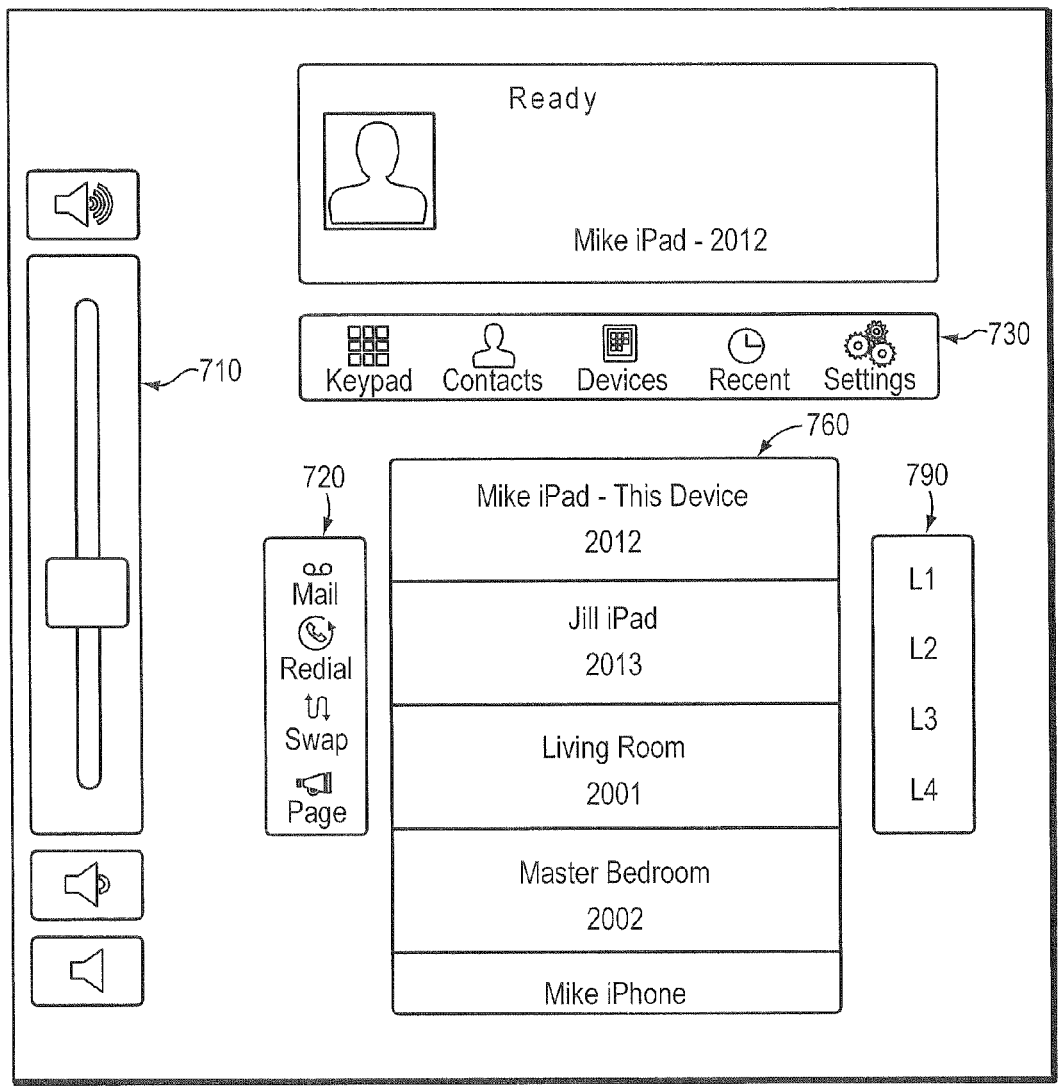
Figure 7D:
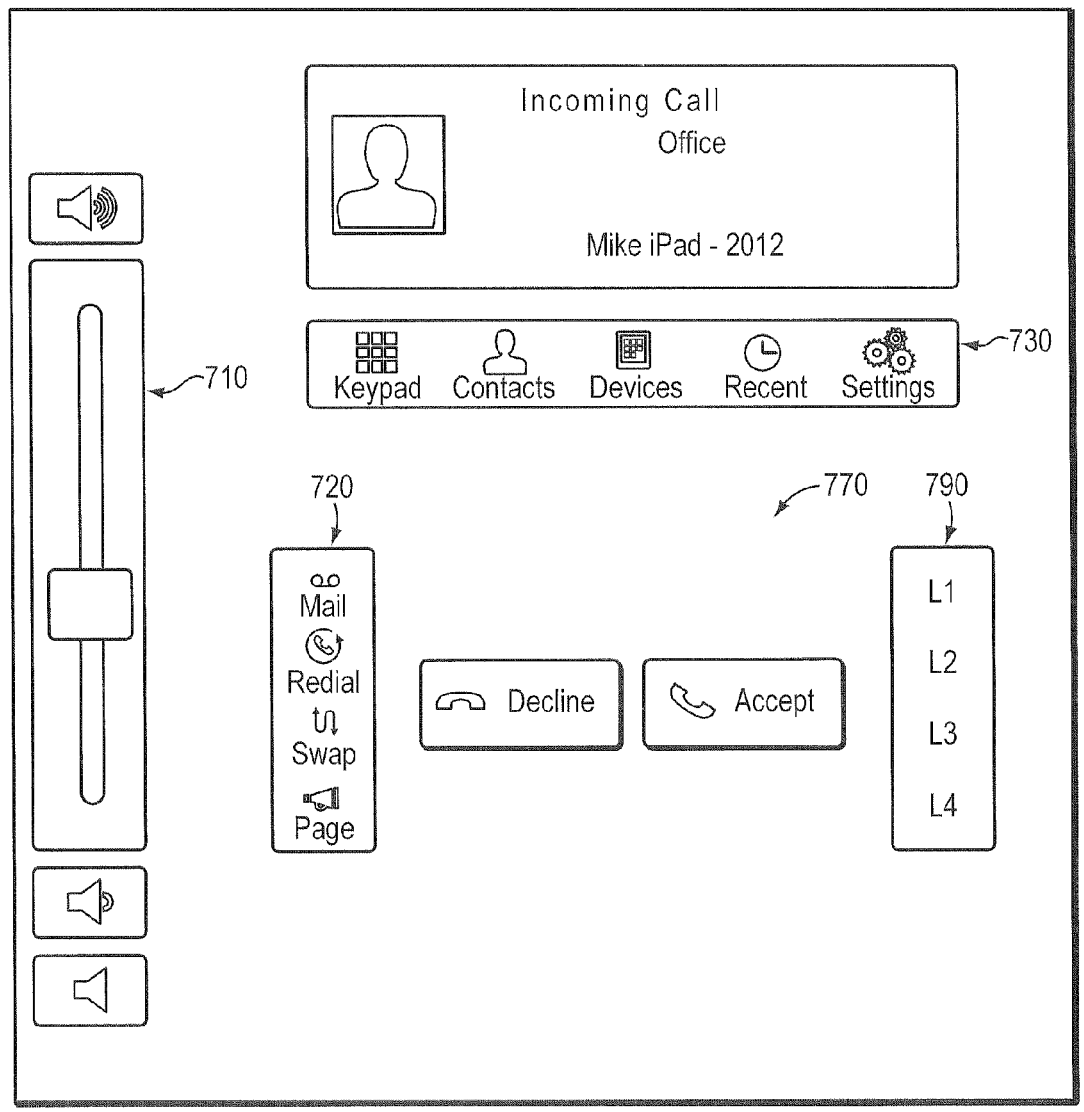
Figure 7E:
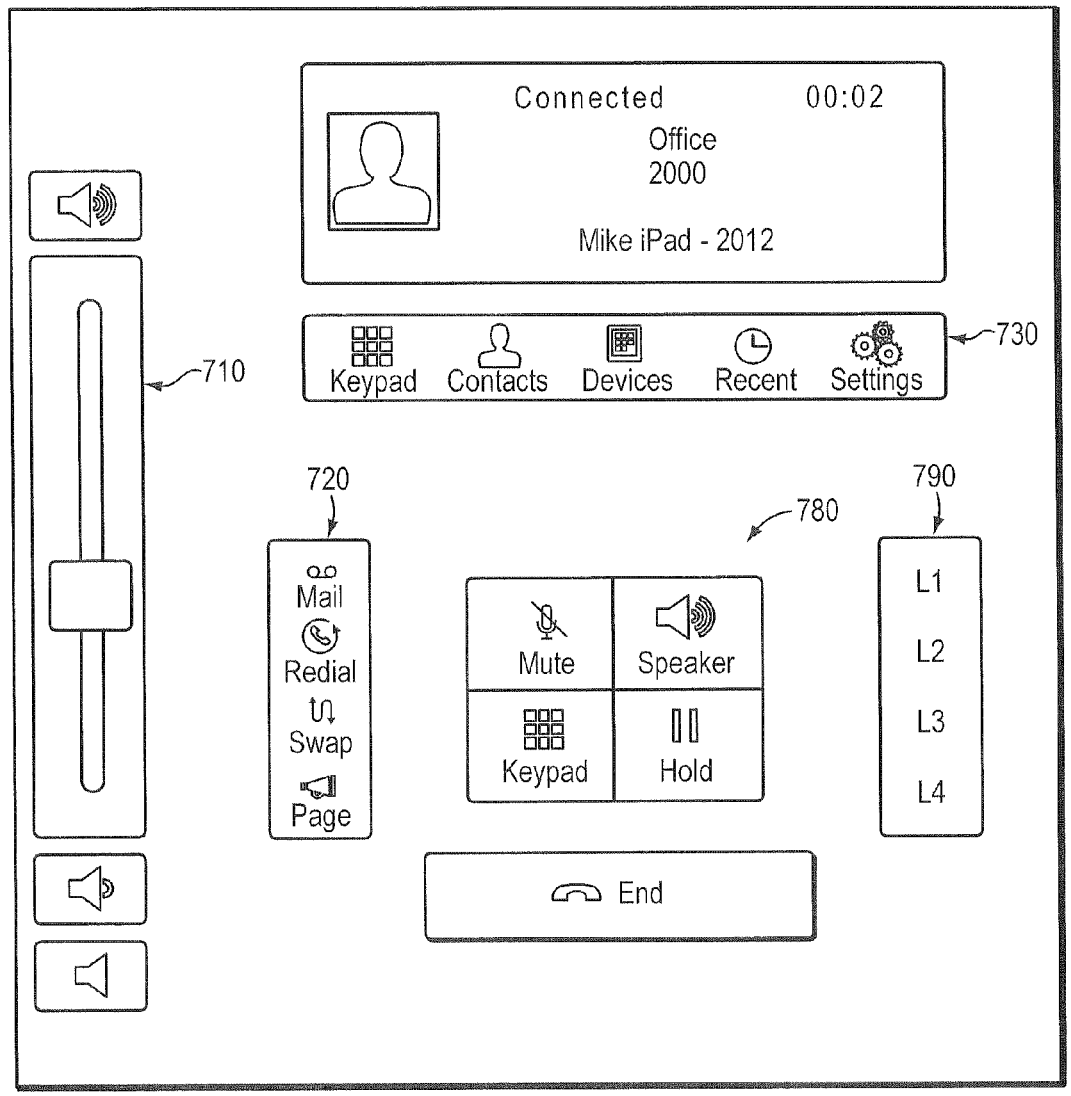
Figure 8D:

Such configuration may be utilized to provide a variety of type of advanced operation. Endpoints, and in particular mobile devices 400, may frequently enter and leave the IP LAN 150 and thereby enter and leave communication with the IP PBX 340. While the IP PBX 340 may learn of their arrival or departure, other endpoints (e.g., mobile devices) may have little knowledge of their presence or absence without the techniques disclosed herein. FIG. 6 is a flow diagram of an example sequence of steps that may be executed when an endpoint (e.g., a mobile device) enters the IP LAN. At step 605, upon entry to the IP LAN 150 the endpoint (e.g., mobile device) may send a message to register with the IP PBX 340. At step 610, the endpoint may send a registration message to the state center 235 indicating it is registering with the IP PBX 340 and is available for sending and receiving calls. Other endpoint (e.g., mobile devices) may have previously registered with the state center 235 to receive notifications of endpoints that have registered with the IP PBX 340. At step 615, in response to the change in telephony state recorded in the state center 235, a notification message may be sent to the other endpoints (e.g., mobile devices) that have registered to receive notifications. In step 620, the other endpoints may take a responsive action, for example, update a listing of endpoints to which a call may be initiated shown in their telephony user interface, to reflect the new endpoint has registering with the IP PBX 340. Further, at step 625, in response to the change in telephony state recorded in the state center 235, a notification message may be sent to the control module 230 on the programmable multimedia controller 200. In step 630, the programmable multimedia controller 200 may take a responsive action, for example, initiate a workflow that controls and/or switches data between various ones of the A/V and home automation devices coupled to the programmable multimedia controller 200. The workflow, may also cause the issue of control commands to the IP PBX 340.

At step 635, the endpoint (e.g., mobile device) may send a message to the IP PBX 340 to place a call or accept a received call. At step 640, the endpoint may send a registration message to the state center 235 indicating a call has commenced. At step 645, in response to the change in telephony state recorded in the state center 235, a notification message may be sent to the control module 230 on the programmable multimedia controller 200. In step 650, the programmable multimedia controller 200 may take a responsive action, for example, initiate a workflow. The workflow may, for instance, direct A/V devices in the vicinity of the endpoint to pause or mute audio or video being played, and direct home automation devices, such as a lighting controller, to adjust operations in the vicinity of the endpoint, for example, brighten the lights if they are dimmed. Further, the workflow may issue commands to the IP PBX 340 in response to the state of A/V and/or home automation devices in the vicinity of the endpoint taking part in the call. At step 655, in response to the change in telephony state recorded in the state center 235, a notification message may be sent to the other endpoints (e.g., mobile devices) that have registered to receive notifications. In step 660, the other endpoints may take a responsive action, for example, update a status indication for the endpoint in the listing of endpoints shown in their telephony user interface to show it is involved in a call. In such manner, the state center 235, in conjunction with the other software described herein, may enable telephony responsive A/V and home automation device control, and A/V and home automation device responsive telephony control.

FIGS. 7A-7E are screen shots of an example telephony user interface that can be displayed on an endpoint, for example, on a touch screen of a mobile device 400, to provide telephone handset functionality. Such interface may include a plurality of touch-activated elements arranged into various control groups and displays. For example, a volume controls group 710 and a mail and paging controls group 720 may be provided. A menu bar 530 may provide access to various selectable displays including a keypad display 740, a contacts list display 750, a device list 760 as well as further displays. As discussed above, the device list 760 may include a listing of endpoints that have registered with the IP PBX 340 that is dynamically updated in response to notifications from the state center 235. Various event activated displays may be provided, including an incoming call display 770 that includes touch-activated elements for answering an incoming call, and an ongoing call display 780 that includes touch-activated elements for managing an ongoing call. Finally, a share group list 790 may be displayed that includes interface elements for selecting one or a plurality of share groups (e.g. share group "L1", share group "L2", share group "L3", etc.) the operations of which are discussed in more detail below.

According to an embodiment of the present disclosure a plurality of selectable share groups may be provided by the IP PBX 340 to enable dynamic conference call-like functionality. The IP PBX 340 may have one or more static shared line appearances (SLAs) to which endpoints are assigned and removed from by a user changing configuration settings of the IP PBX 340, for example, through the web user interface 510 and the Configurator backend 350. In addition, the IP PBX 340 may offer one or more dynamic SLAs, to which endpoints are assigned and removed by users of endpoints selecting an interface element of a corresponding share group, such as in share group listing 790. For example, all endpoints on which an interface element for a first share group (e.g., "L1") is selected may be dynamically placed into a first SLA. Similarly, all endpoints one which an interface element for a second share group (e.g., "L2") is selected may be dynamically placed into a second SLA. Endpoints may join a SLA at any time in response to user-selection of the interface element for the share group. Similarly, they may leave a SLA at any time in response to user de-selection of the interface element for the share group. Similarly, they may also transition to a different SLA by user-selection of an interface element corresponding to another share group.

FIGS. 8A-8D are screen shots of an example web user interface that can be used in conjunction with the Configurator backend 350 to configure the IP PBX 340. A system overview panel 810, a devices panel 820, a shared line panel 830, a view/edit shared line stations panel 840, as well as a number of other panels for other functions may be provided. The overview panel 810 and the devices panel 820 may include a listing of endpoints that have registered with the IP PBX 340 upon joining the LAN 150. Such list of endpoints may coincide with a list of endpoints maintained by the state center 235, which may be disseminated as described above. The shared line panel 830 and the view/edit shared line stations panel 840 may be utilized to create and add endpoints to one or more static SLAs. As discussed above, endpoints may be added or removed from dynamic SLAs via selections in share group list 790 of the telephony user interface of each endpoint.

It should be understood that various adaptations and modifications may be made within the spirit and scope of the embodiments herein. Further, it should be understood that at least some portions of the above-described techniques may be implemented in software, in hardware, or a combination thereof. A software implementation may include computer-executable instructions stored in a non-transitory computer-readable medium, such as a volatile or persistent memory, a hard-disk, a compact disk (CD), or other tangible medium. A hardware implementation may include configured processors, logic circuits, application specific integrated circuits, and/or other types of hardware components. Further, a combined software/hardware implementation may include both computer-executable instructions stored in a non-transitory computer-readable medium, as well as one or more hardware components, for example, processors, memories, etc.

Accordingly, it should be understood that the above descriptions are meant to be taken only by way of example.

What is claimed is:

1. A method comprising:
receiving a registration message at a state center from a mobile device within a home, the mobile device supporting voice over Internet Protocol (VoIP) calling, the registration message indicating telephony event involving the mobile device and an Internet Protocol private branch exchange (IP PBX) separate from the state center occurred in the home, the telephony event being the mobile device becoming available to the IP PBX for sending or receiving calls, the mobile device currently placing a call through the IP PBX, or the mobile device currently receiving a call via the IP PBX;
based on the registration message, updating telephony state at the state center to indicate the telephony event involving the mobile device and the IP PBX; and
sending a notification message to one or more first devices within the home that have registered to receive notification messages from the state center for telephony events, to inform the one or more first devices of occurrence of the telephony event involving the mobile device and the IP PBX and to cause at least one first device to perform a responsive action that controls an audio/video (A/V) or home automation device within the home in response to the telephony event, wherein the one or more first devices include another mobile device within the home that supports VoIP calling and that is configured to update a telephony user interface in response to the telephony event.

2. The method of claim 1, wherein the at least one first device is a programmable multimedia controller.

3. The method of claim 1, further comprising
receiving another registration message from a control module, the another registration message indicating a control event related to operation of an A/V or home automation device within the home;
based on the another registration message, updating control state at the state center to indicate the control event; and
sending a notification message to one or more second devices within the home that have registered to receive notification messages from the state center for control events, to inform the one or more second devices of occurrence of the control event and to cause at least one second device to perform a responsive action that controls a call in response to the control event.

4. The method of claim 3, wherein the at least one second device is the IP PBX.

5. The method of claim 1, wherein the telephony event is the mobile device becoming available to the IP PBX for sending or receiving calls.

6. The method of claim 1, wherein the telephony event is the mobile device currently placing a call or the endpoint currently receiving a call.

7. The method of claim 6, wherein the mobile device currently placing a call or the mobile device currently receiving a call includes joining a share group that provides a dynamic shared line appearance (SLA).

8. An apparatus comprising:
a processor;
a memory configured to store software for execution by the processor, the software including a state center that when executed is operable to
process a registration message from a mobile device within a home, the mobile device supporting voice over Internet Protocol (VoIP) calling, the registration message indicating a telephony event involving the mobile device and an Internet Protocol private branch exchange (IP PBX) occurred in the home, the telephony event being the mobile device becoming available to the IP PBX for sending or receiving calls, the mobile device currently placing a call through the IP PBX, or the mobile device currently receiving a call via the IP PBX,
based on the registration message, update control state to indicate the telephony event involving the mobile device and the IP PBX, and
send a notification message to one or more first devices within the home that have registered to receive notification messages from the state center for telephony events, to inform the one or more first devices of occurrence of the telephony event involving the mobile device and the IP PBX and to cause at least one first device to perform a responsive action that controls an audio/video (A/V) or home automation device within the home in response to the telephony event, wherein the one or more first devices include another mobile device within the home that supports VoIP calling and that is configured to update a telephony user interface in response to the telephony event.

9. The apparatus of claim 8, wherein the at least one first device is a programmable multimedia controller.

10. The apparatus of claim 8, wherein the state center when executed is further operable to
process another registration message from a control module, the another registration message indicating a control event related to operation of an A/V or home automation device within the home,
based on the another registration message, update control state to indicate the control event, and
send a notification message to one or more second devices within the home that have registered to receive notification messages from the state center for control events, to inform the one or more second devices of occurrence of the control event and cause at least one second device to perform a responsive action that controls a call in response to the control event.

11. The apparatus of claim 10, wherein the at least one second device is the IP PBX.

12. A method comprising:
upon entry of a mobile device that supports voice over Internet Protocol (VoIP) calling to a local area network (LAN) for a home, sending a registration message from the mobile device to an Internet Protocol private branch exchange (IP PBX) for the home to indicate that the mobile device is available to the IP PBX for sending or receiving calls;
sending a parallel registration message from the mobile device to a state center separate from the IP PBX to update telephony state at the state center to indicate the mobile device is available to the IP PBX for sending or receiving calls;
in response to the update of telephony state, sending a notification message from the state center to a device that has registered to receive notification messages, to inform the device that the mobile device is available to the IP PBX for sending or receiving calls; and
performing a responsive action within the home by the device based on to the notification message, wherein the device is another mobile device that supports VoIP calling, and the responsive action is updating a telephony user interface of the another mobile device.

13. The method of claim 12, wherein the device is a programmable multimedia controller, and the responsive action is controlling an audio/video (A/V) or home automation device located proximate to the mobile device.

14. The method of claim 12, further comprising:
sending a registration message from the mobile device to the IP PBX to place a call or to receive a call;
sending a parallel registration message from the mobile device to the state center separate from the IP PBX to further update telephony state at the state center to indicate the mobile device has placed the call or received the call;
in response to the further update of telephony state, sending a second notification message from the state center to the device that has registered to receive notification messages, to inform the device that the mobile device has placed the call or received the call; and
performing a second responsive action within the home by the device based on the second notification message.

15. The method of claim 14, wherein the device is a programmable multimedia controller and the second responsive action is controlling an audio/video (A/V) or home automation device.

16. The method of claim 14, wherein the device is another mobile device that supports VoIP calling, and the second responsive action is updating a telephony user interface of the another mobile device.

17. The method of claim 12, wherein the mobile device joins a share group that provides a dynamic shared line appearance (SLA) for the call.

* * * * *